United States Patent
Laurent

[11] 3,775,737
[45] Nov. 27, 1973

[54] DEVICE FOR SENSING PRESSURE IN A LIQUID MEDIUM

[75] Inventor: Jean Laurent, Yvelines, France

[73] Assignee: Institut Francais du Petrole des Carburants et Lubrifiants, Rueil-Malmaison, Hauts-de-Seine, France

[22] Filed: Mar. 3, 1972

[21] Appl. No.: 231,676

[30] Foreign Application Priority Data
Mar. 3, 1971 France .................... 7107392

[52] U.S. Cl. .................... 340/7 R, 340/10
[51] Int. Cl. .................... G01v 1/16
[58] Field of Search .................... 340/7 R, 10

[56] References Cited
UNITED STATES PATENTS
2,791,757  5/1957  Blake et al. .................... 340/7 R
3,432,000  3/1969  Ongkeihong et al. .................... 340/10

Primary Examiner—Benjamin A. Borchelt
Assistant Examiner—H. A. Birmiel
Attorney—Paul M. Craig, Jr. et al.

[57] ABSTRACT

A flexible seismic sensing cable includes cylindrically shaped piezoelectric sensing elements separated by cylindrically shaped insulating spaces along the longitudinal axis of the cable. Spirally-wound conductors are disposed concentrically within and around the sensing elements and spaces to provide a voltage pick-off. A protective tubular housing transparent to acoustic waves surrounds the outer conductors, while an inner tube, filled with a fluid for forcing the conductors against the sensing elements, is positioned against the inner conductors.

10 Claims, 3 Drawing Figures

DEVICE FOR SENSING PRESSURE IN A LIQUID MEDIUM

The present invention relates to a device for sensing the pressure in a liquid medium and, more particularly, to a device comprising a large number of elements being sensitive to acoustic waves and disposed in a quasi-continuous fashion inside an elongated element and constituting a flexible unit.

This device may be used, for example, for seismic prospecting in the ocean and may be incorporated in an immersed seismic cable of great length, adapted to be pulled or drawn by a ship. It allows for detecting the waves emitted by a pressure wave generator and reflected by the different layers of the immersed subsoil.

The generally employed seismic cables comprise an elongated body and distributed at regular intervals at the inside of which are hydrophones comprising, for example, plane piezoelectric elements which are responsive to bending forces, or cylindrical elements responsive to compression. These elements include a conductor sheathing on the inner and outer surfaces thereof.

These sheathings constitute electrodes and are connected to collectors being disposed at the inside and at the outside of the sensitive elements.

The seismic cables or streamers have, most frequently, a significant length and must be wound up on the towing ship after they have been used.

The provision of electric connections between the electrodes and the connector is rather delicate in view of the stresses that are imposed due to the operations of winding and unwinding the seismic cables. This drawback is particularly noticeable when the number of sensitive elements is increased in order that an almost continuous sensing or pick-up of acoustic waves can be obtained.

The present invention is directed to and concerned with a quasi-continuous sensing device of acoustic waves comprising an arrangement of collectors which avoids the drawbacks mentioned hereinabove.

The sensing device proposed by the present invention comprises a plurality of tubular elements which are sensitive to pressure and made from piezoelectric material. These elements are disposed in alignment and comprise electrodes on the inner and outer surfaces thereof. The device equally comprises inner and outer conductor means in order to respectively interconnect the inner and outer electrodes, tubular insulating elements made of flexible material for separating the sensitive elements from each other, and an outer envelope or housing. The sensitive elements are split according to a generator line. They operate in response to bending forces and, by virtue of this fact, possess a greater sensitivity than the continuous piezoelectric cylinders which operate in response to compression. This device is characterized in that it comprises an inflatable inner tube containing a compressed fluid for purposes of applying the inner conductor means to or upon the inner electrodes. The outer envelope or housing may consist of a tube made from thermoretractable material. The manner in which this device is made renders it particularly sturdy and reliable.

Other characteristics and advantages of the inventive device will become apparent from a reading of the following description thereof, taken in connection with the accompanying drawings which illustrate one non-limitative embodiment thereof, and wherein.

Figure 1A:
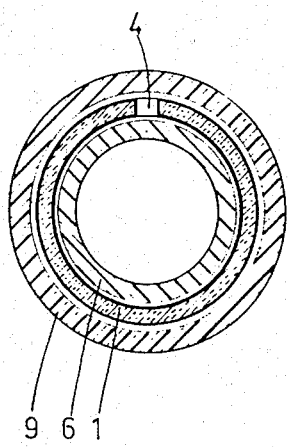
FIG. 1A is a transverse cross-sectional view taken along line AA of the device shown in FIG. 1.
Figure 1:
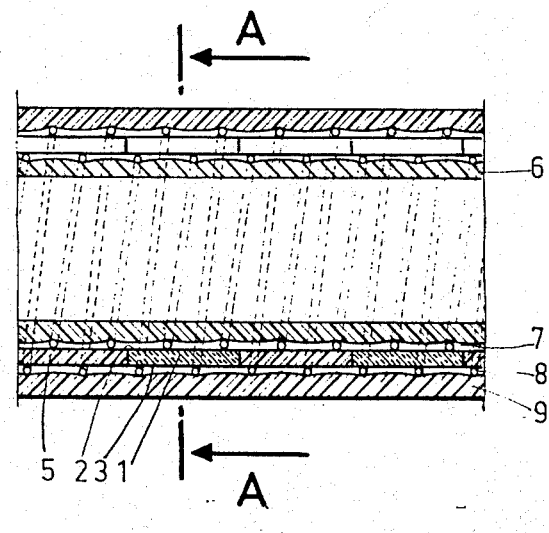
FIG. 1 is a longitudinal cross-sectional view of a portion of the device according to the present invention.

When viewing FIGS. 1 and 1A, it becomes apparent that the device according to the present invention comprises tubular elements 1 made of piezoelectric material which are radially polarized and covered or sheathed respectively on the inner and outer surfaces thereof with layers 2 and 3 of a conductor material. A slit 4 is provided in each element according to or following a generator line. Disposed between two consecutive elements 1 is a tubular element 5 made of flexible material, for example rubber. The dimensions thereof are essentially equal to those of each sensitive element 1. The elements 1 and 5 have, for example, a length which is substantially equal to half of their outside diameter, and the thickness of each is relatively small, for example, one-tenth of the outside diameter. The elements 1 and 5 are alternately threaded upon a flexible tube 6 on which a conductor winding 7 is disposed. This winding may consist, for example, of a fine copper wire or of a very thin band of conductor material which is spirally wound on the tube 6. The spacing or pitch of this spiral is so chosen that either one or two turns is in contact with the inner conductor sheathing of each element 1. A small number of turns allows for preserving the flexibility of the device. The tube 6 is inflated by means of compressed air and forces the conductor winding 7 against the sheathing 2.

A conductor wire 8, similar to the conductor wire 7, is wound in the form of a spiral having a substantially identical pitch on to the outer surface of the cylinders 1 and 5. A flexible tube 9 which is transparent with respect to acoustic waves and made of a thermoretractable material will cause the winding 8 to firmly abut the outer conductor layers 3 of the elements 1.

Figure 2:
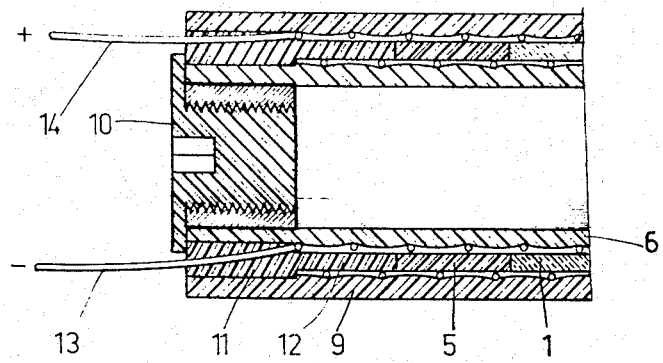
FIG. 2 is a longitudinal cross-sectional view of one of the terminal portions of the device of FIG. 1.

As shown in FIG. 2, each end of the device is closed off by means of a stopper or plug 10. One of these stoppers or plugs is equipped with a system (not shown) which renders it possible to keep the pressure prevailing in the inner tube 6 at a chosen value. The space between the two tubes 6 and 9 is closed by means of an insulating ring 11 comprising an annular portion 12 having an inner and outer diameter essentially equal to the corresponding diameters of the cylinders 1 and 5. It assures the electric insulation of the windings 7 and 8 with respect to each other. The ring 11 also includes fluid-tight passages through which extend conductors 13 and 14 respectively connected with the ends of the windings 7 and 8. These conductors are connected to a preamplification circuit.

When pressure appears in the outer liquid medium, it is transmitted by the tube 9 to the elements 1 which are accordingly deformed. The slit 4 provided in each of them is thereby closed. By reason of the stresses which the piezoelectric material undergoes, a voltage appears between the inner and outer surfaces of the elements 1. The windings 6 and 8 transmit the voltage to one end of the device.

The slotted cylinders 1 operate by bending and have a greater sensitivity than continuous elements which operate by compression.

Each device comprises a number of piezoelectric elements usually between 10 and 50. Since these elements are connected in parallel by the windings 7 and 8, the capacitance of the entire unit or group is equal to the sum of the unit capacitances. For a convenient global capacitance, each element 1 may have a low capacitance and hence, small dimensions. This characteristic is significant since the choice of piezoelectric elements having a small diameter contributes to the realization of seismic cables having small overall dimensions. The pitch of the windings 7 and 8 is chosen sufficiently large in order that they be adapted to easily follow the variations in the diameter of the elements due to the effect of the stresses being exerted.

The flexible elements 5 which separate the rigid elements 1 facilitate the winding of the device during periods of storage. They also avoid the occurrence or production of "noise" due to friction between the sensitive elements. The simplicity in the assembly of the device is readily apparent. The elements 1 and 5 are threaded around the inner tube 6 on which the conductor wire 7 is wound. The introduction of compressed air at the inside of the tube applies the winding 7 on the inner electrodes of the elements 1. A conductor wire 8 is thereafter wound in the form of a spiral on the outer surface of the elements 1 and 5. The outer tube 9 made of thermo-retractable material and having an inside diameter which is slightly larger than the outside diameter of the elements is threaded upon the latter and contracted by heating. This process of applying the windings onto the elements also affords the advantage of preventing any significant lateral sliding or slipping of the conductor wires 7 and 8 at the time of the successive operations of winding and unwinding the device.

The device proposed by the present invention has been described hereinabove only by way of example which is not limitative thereof, since other modifications could well be used without departing from the spirit and scope of the invention such as defined in the attached claims.

I claim:

1. A device for sensing pressure variations comprising:
   a plurality of tubular elements sensitive to pressure disposed in alignment and being slotted along an axial direction, said elements being made of piezoelectric material and comprising inner and outer electrodes respectively disposed on the inner and outer surfaces thereof;
   tubular insulating elements made of flexible material for separating said tubular elements from each other;
   inner conductor means for interconnecting said inner electrodes;
   outer conductor means for interconnecting said outer electrodes;
   an outer envelope disposed around said outer conductor means; and
   an inflatable inner tube containing a compressed fluid for forcing said inner conductor means against said inner electrodes of said sensitive elements.

2. A device according to claim 1, wherein said outer envelope comprises of a tube made of thermo-retractable material.

3. A device according to claim 1, wherein said inner and outer conductor means comprise conductor windings the pitch of which is equal to at least half the length of each sensitive element and at most equal thereto.

4. A device according to claim 3, wherein said windings comprise a thin conductor band.

5. A device according to claim 1, wherein said inner tube is closed off at each end by means of a stopper, one of which comprises means for introducing a compressed fluid into said tube.

6. A device according to claim 1, further including a ring disposed at the end of said device adjacent said stopper, said ring comprising means for electrically insulating the ends of the windings from each other, and fluid-tight passages for conductors connected to the ends of said windings.

7. A device according to claim 4, wherein said outer envelope comprises of a tube made of thermo-retractable material.

8. A device according to claim 4, wherein said inner tube is closed off at each end by means of a stopper, one of which comprises means for introducing a compressed fluid into said tube.

9. A device according to claim 7, wherein said inner tube is closed off at each end by means of a stopper, one of which comprises means for introducing a compressed fluid into said tube.

10. A device according to claim 9, further including a ring disposed at the end of said device adjacent said stopper, said ring comprising means for electrically insulating the ends of the windings from each other, and fluid-tight passages for conductors connected to the ends of said windings.

* * * * *